Oct. 21, 1952  M. H. ALLDREDGE ET AL  2,614,862
STEERING LINKAGE
Filed Sept. 21, 1949
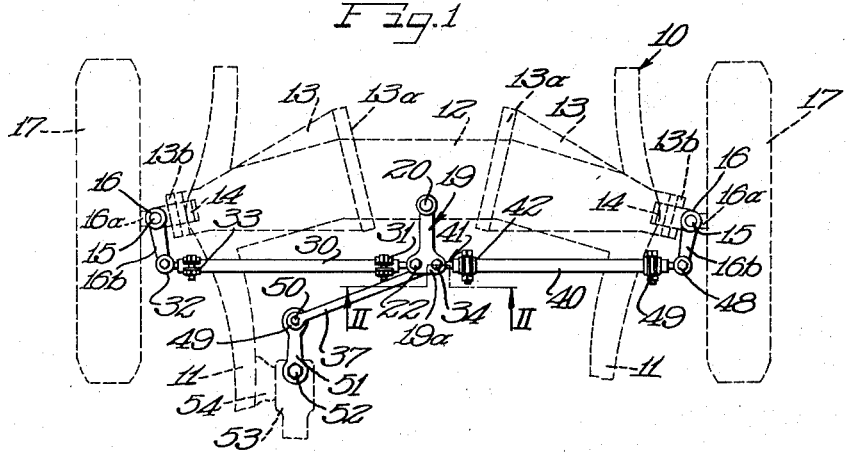
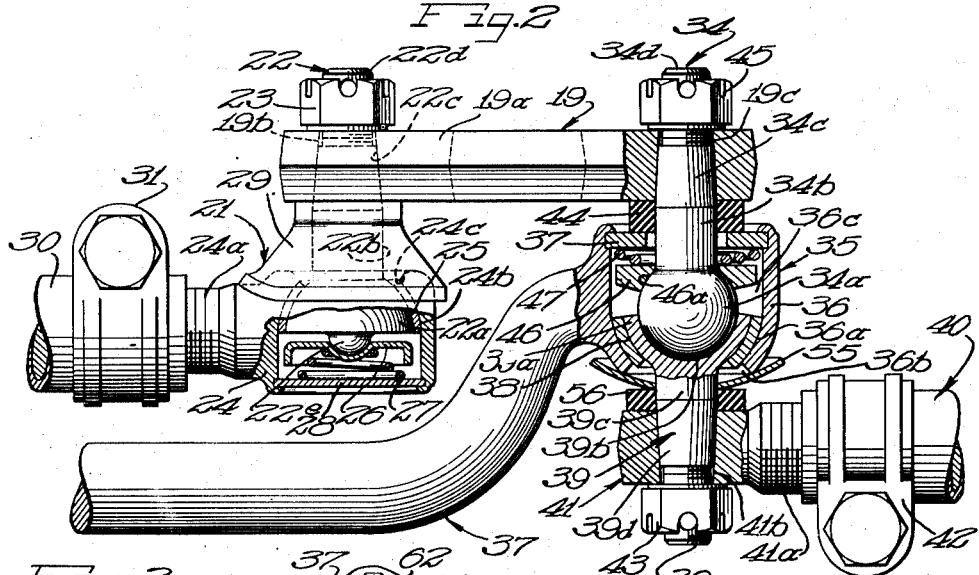
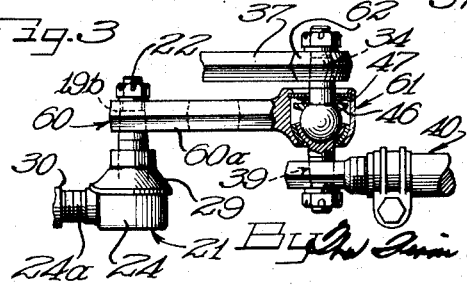
Inventors
Marshall H. Alldredge
Matthew P. Graham Patented Oct. 21, 1952

2,614,862

UNITED STATES PATENT OFFICE 2,614,862

STEERING LINKAGE

Marshall H. Alldredge, Detroit, and Matthew P. Graham, Grosse Pointe, Mich., assignors to Thompson Products, Inc., Cleveland, Ohio, a corporation of Ohio Application September 21, 1949, Serial No. 116,957

4 Claims. (Cl. 280—95)

1

This invention relates to a steering linkage embodying a single joint affording a three way connection in the linkage and adapted to accommodate relative rotation and tilting of three linkage members without loss of steering movement of the members.

Specifically, the invention deals with a center point steering linkage for automotive vehicles wherein a double studded joint connects the idler arm, the drag link, and a tie rod in aligned superimposed relation while accommodating relative rotation and tilting thereof.

The invention will hereinafter be specifically described as embodied in a center point steering linkage for independently suspended wheels of an automotive vehicle but it should be understood that the principles of this invention in their broader aspects are applicable to steering linkages in general wherein a single joint affords a three-way connection without loss of steering motion between the links while accommodating independent relative rotation and tilting of the links.

In accordance with the preferred embodiment of this invention, an idler arm pivotally anchored to the frame of an automotive vehicle close to the longitudinal middle of the vehicle has a single ball joint connection with a tie rod and a double ball joint connection with another tie rod and a drag link. The tie rods are connected through ball joints with the steering arms of the dirigible wheels while the drag link is connected through a ball joint with the pitman arm of the steering chuck or steering gear assembly. The double studded ball joint has an open ended socket with ball studs projecting through the open ends of the socket and having head portions tiltably and rotatably mounted in the socket.

A feature of the double studded ball joint is the provision of rigid mating thrust parts on the ball studs so that a common tilting center is maintained and steering motions are transmitted without loss. The socket of the joint can be provided on the idler arm, the drag link, or a tie rod and in each instance the connections of the three members will be maintained in operative assembly for tilting and rotation about a common center.

It is, then, an object of this invention to provide a steering linkage for automotive vehicles and the like wherein a multi-studded joint affords a three way connection in the linkage and maintains the link members in operative movable assembly about a common pivot center.

A more specific object of the invention is to provide a steering linkage of the center point type wherein the drag link and one of the tie rods are connected to a single joint carried by the center point idler arm.

A still further object of the invention is to

2 provide a steering linkage for dirigible vehicles wherein one of the heretofore required joints is eliminated and wherein a single joint affords a three way connection and transmits steering movements without loss of mechanical advantage.

A still further object of the invention is to provide a steering linkage especially adapted for independently suspended steerable wheels wherein a single joint affords a three way connection and holds the parts in relative rotatable and tilting relation about a common center.

Other and further objects of the invention will be apparent to those skilled in the art from the following detailed description of the annexed sheet of drawings which, by way of preferred examples only, illustrates two embodiments of the invention.

On the drawings:

Figure 1 is a diagrammatic plan view of a center point steering linkage for an individual wheel suspension constructed and arranged in accordance with one embodiment of this invention.

Figure 2 is a longitudinal view, with parts in vertical cross section, taken along the line II—II of Figure 1.

Figure 3 is a view similar to Figure 2 but showing a modified embodiment of the linkage.

As shown on the drawings:

In Figure 1 the reference numeral 10 designates generally an automobile chassis having longitudinal frame members 11, 11 and a transverse frame member 12. A pair of wishbone type lower links or axles 13, 13 are pivoted on the transverse member at their inner ends 13a, 13a and extend outwardly to pivot connections 13b, 13b at their outer ends with vertical links 14, 14 carrying king bolts 15, 15. The king bolts pivotally carry steering knuckles 16, 16 having stub axles 16a rotatably supporting the dirigible wheels 17. The steering knuckles also have steering arms 16b extending therefrom between the chassis 10 and the wheels 17.

A center link arm or pivot arm 19 is mounted for swinging about a vertical pivot 20 on the cross frame 12. The arm 19 extends rearwardly from the pivot 20 and has a transversely extended head portion 19a with tapered bores 19b and 19c therethrough as shown in Figure 2. A tie rod joint 21 has the stud 22 thereof mounted in the tapered bore 19b. This stud 22 has a semi-ball head 22a, a cylindrical shank 22b extending from the small end of the head, a tapered shank portion 22c in the bore 19b, and a threaded end 22d receiving a nut 23 in threaded engagement therearound. When the nut is tightened the tapered portion 22c of the stud shank will be drawn into wedge fit engagement with the bore 19b.

The joint 21 also has a socket or housing 24 with a laterally extending threaded stem 24a. The housing 24 is open ended and has a bearing wall 24b at one end thereof converging to a reduced diameter opening 24c which accommodates the stud shank 22b freely therethrough. A bearing ring 25 is tiltable on the bearing wall 24b and receives the stud head 22a in rotatable relation therein. The stud head has a depending central button end 22e seated in a spring-urged retainer 26 in the housing 24 and a spring 27 compressed by a closure plate 28 for the other open end of the housing will maintain the retainer against the button end 22e and thereby urge the stud head against the ring 25 and the ring 25 against the bearing wall 24b. A rubber or other flexible material dust cap 29 surrounds the open end of the socket and that portion of the stud betwen the socket and the bottom face of the arm portion 19a. The stud 22 is fixed to this portion 19a but the socket can tilt and rotate on the stud.

The stem 24a is threaded into the inner end of a first tie rod 30 and is held therein in adjusted position by a clamp 31. The outer end of the tie rod 30, as shown in Figure 1, carries a tie rod joint 32 similar to the above described joint 21 and the socket of this joint 32 is clamped in the outer end of the tie rod 30 by a second clamp 33. The tie rod joint 32 has the stud thereof affixed to the steering arm 16b at the left side of the chassis 10.

The tapered bore 19c of the pivot arm 19 has a stud 34 fixedly mounted therein. This stud is part of the three way joint 35 that makes possible the elimination of a heretofore necessary third joint. As shown in Figure 2, the joint 35 has a socket 36 on the end of a drag link 37. This socket 36 has an inturned end defining a fragmental spherical bearing wall 36a which converges to a reduced diameter opening 36b. The other end of the socket is cylindrical to provide a chamber 36c and this chamber is closed by a washer 37 which is spun into fixed position in the top end of the socket.

A bearing ring 38 is tiltably mounted on the bearing wall 36a and receives the head 39a of a stud 39 in rotatable relation therein. This head 39a of the stud has a fragmental spherical recess 39b receiving the ball end 34a of the stud 34.

The stud 39 has a cylindrical shank portion 39c projecting freely through the reduced opening 36b of the socket and a tapered shank portion 39d converges from the cylindrical portion 39c to a threaded end 39e.

A second tie rod 40 has a split internally threaded end receiving the threaded stem 41a of an eye member 41. A clamp 42 holds the stem in adjusted threaded position in the tie rod 40. The eye 41 has a tapered bore 41b receiving the tapered shank 39d therethrough. A nut 43 on the threaded end 39e of the stud wedges the tapered shank 39d into tight fitting engagement in the eye member.

The stud 34 has a cylindrical shank 34b extending freely from the ball end 34a thereof through washer 37 and through a rubber washer or grommet 44 to a tapered shank portion 34c which converges to a threaded end shank portion 34d. The tapered portion 34c fits in the bore 19c and a nut 45 on the threaded end 34d wedge fits the tapered shank into the tapered bore.

A washer 46 is freely disposed in the chamber portion 36c of the socket and has a fragmental spherical bore 46a therethrough disposed around the ball end 34a of the stud adjacent the cylindrical shank portion 34b. The washer 46 is spring urged against the ball end 34a by a coil spring 47 which is compressed between the washers 37 and 46. The spring 47 is effective to hold the washer 46 against the ball end 34a and to raise the socket end so that the bearing wall 36a thereof will maintain a seating engagement with the bearing ring 38 and so that the bearing ring in turn will remain in seating engagement with the head 39a of the stud 39.

The second tie rod 40 is connected at its outer end to a tie rod joint 48 as shown in Figure 1, and this joint has the stem thereof threaded into the tie rod and held therein by the clamp 49, while the stud thereof is secured in the steering arm 16b at the right hand side of chassis 10.

The drag link 37 has an eye end 49 connected through a tie rod type joint 50 to a pitman arm 51 which is mounted on the chuck 52 of a steering box 53 which is carried on a bracket 54 from the left hand side frame 11 of the chassis 10. When the mechanism in the steering box 53 is actuated by the conventional steering wheel (not shown) the pitman arm 51 is swung in an arc to move the drag link 37 longitudinally. This longitudinal movement is, of course, imparted to the socket 36 on the end of the drag link thereby moving the joint parts and causing the stud 34 to swing the steering arm 19 about the pivot 20 while the stud 39 shifts the second tie rod 40. The swinging pivot arm 19 shifts the tie rod joint 21 to impart the steering movement to the tie rod 30. The steering arms 16b are thereby caused to pivot about the king bolts 15 and the wheels 17 are turned.

The studs 34 and 39 are nested together for tilting about the common center of the ball head 34a and therefore no loss of steering movement will be incurred irrespective of the relative tilted positions of the drag link and tie rods. Since the wheels 17 are independently suspended and can move up and down about the pivots 13a, the tie rods will frequently be tilted in different planes, but the steering motion that is transmitted through the joints will not be impaired and any mechanical advantage obtained by the assembly will be preserved irrespective of the relative positions of the parts. It will be appreciated that the drag link 37 can tilt about the common ball center 34a and that the tie rod 40 can tilt independently of the drag link about this same common center of the ball head 34a.

In order to seal the joint 35 against loss of lubricant or ingress of dirt, a dust cap 55 is disposed over the open end 36b of the socket 36 and fits snugly around the cylindrical shank portion 39c of the stud 39 to be moved therewith. The dust cover can slide over the open end of the housing as relative movement occurs between the housing and stud 39. A rubber washer 56 also disposed snugly around the stud shank is bottomed on the eye 41 and holds the dust cap 55 against the under face of the socket 36.

In the linkage arrangement of Figure 3, the double-studded joint 35 of Figures 1 and 2 is replaced with a double-studded joint having the housing thereof integrally formed in a modified center arm 60. Other parts of the assembly identical with parts described in Figures 1 to 3 have been marked with the same identifying reference numerals. As shown, the arm 60 has a head 60a with a tapered bore 19b receiving the stud 22 of the tie rod joint 21 for the left hand tie rod 30. The tapered bore 19c of the arm 19 is replaced with a socket or housing 61 carrying the ball stud 34 in the top thereof and the ball stud 39 in the bottom thereof. The ball stud 39 is secured to the second tie rod 40, while the ball stud 34 is secured to an eye end 62 of the drag link 37. The arrangement operates in the same manner as the arrangement of Figure 2, but has the drag link 37 above the center arm 60 instead of below the arm 19.

From the above descriptions it should be understood that the invention provides a steering linkage for dirigible vehicles of the independently suspended wheel type wherein a single joint affords a three way linkage connection and holds the links for manipulation about a common center. Since the linkages are actuated from or through this common center, no loss of steering movement is incurred but, at the same time, the links can tilt or rotate relative to each other to accommodate wheel movement or the like.

It will be understood that modifications and variations may be effected without departing from the scope of the novel concepts of the present invention.

We claim as our invention:

1. A steering linkage for dirigible vehicles comprising a frame, independently suspended steerable wheels mounted on said frame, arms for steering said wheels, tie rods connected to said arms, a steering mechanism mounted on said frame, a pitman arm actuated by said steering mechanism, a drag link connected to said pitman arm, a pivot arm mounted on said frame, a pair of joints on the free end of said pivot arm, one of said joints being connected to one of said tie rods and the other of said joints being tiltably and rotatably connected to the other of said tie rods and to the drag link, said other joint having a common tilting center for the tie rod and the drag link, whereby steering movement imparted by the pitman arm is transmitted through the drag link and through said pivot arm to both tie rods for actuating the steering arms without loss of steering movement or mechanical advantage irrespective of the relative levels of the wheels.

2. A steering linkage for dirigible vehicles which comprises a center arm pivoted on the vehicle, a pair of ball studs anchored to the free end of said arm, a first tie rod having a ball socket end receiving one of said studs in tiltable and rotatable relation, a drag link having an open ended socket and receiving the other ball stud through one open end thereof, a second tie rod, a ball stud anchored to one end of said second tie rod and extending through the other open end of said open ended socket, and means in said open ended socket mounting the ball studs therein in rotatable relation to the socket and tiltable about a common center.

3. A center point type steering linkage comprising a center pivot arm having one end adapted for pivotal mounting on a vehicle frame and an outer free end with a plurality of tapered bores therein, a first ball joint having a socket and a stud said stud having a tapered shank wedged in one of said bores, a first tie rod connected to the socket of said first ball joint, a multi-studded ball joint having one of the studs thereof wedge fitted in the other of said tapered bores, a drag link having a socket end for said multi-studded joint, a second tie rod having the second stud of said multi-studded joint anchored thereon, the stud of said multi-studded joint being rotatably and tiltably retained therein, tie rod joints at the outer ends of the tie rods, steering arms connected to said tie rod joints at the outer ends of the tie rods, a pitman arm, and means connecting the pitman arm to the drag link, whereby shifting of the drag link by the pitman arm will move the drag link socket to cause the ball studs of the multi-studded joint to swing the pivot arm and the tie rods for turning the steering arms.

4. A steering linkage for dirigible vehicles which comprises a frame, independently suspended steerable wheels mounted on said frame, arms for steering said wheels, a pair of tie rods, tie rod joints connecting said arms with said tie rods, a steering box mounted on said frame having a rotatable steering chuck projecting therefrom, a pitman arm secured on said steering chuck for swinging about the axis of the chuck as the chuck is rotated, a pivot arm pivotally mounted on said frame for swinging movement about the pivot, a drag link, a joint connecting said drag link with said pitman arm, a pair of joints on said pivot arm, one of said joints being a single ball and socket type joint connected to one of said tie rods, the other of said joints being a double ball and socket type joint having a socket and opposed studs projecting from opposite sides of the socket, opposed bearing means in said socket for said studs, one of said studs being nested in the other of said studs and providing a common tilting center for both studs, means urging one bearing wall in said socket toward the other bearing wall to maintain the studs in proper bearing relation with their bearing walls and with the socket, and said double joint connecting said pivot arm with the other of said tie rods and with said drag link, whereby steering motion imparted by the pitman arm is transmitted through the drag link and through the pivot arm to both tie rods for actuating the steering arms without loss of steering movement or mechanical advantage irrespective of the relative levels of the independently suspended steerable wheels.

MARSHALL H. ALLDREDGE.
MATTHEW P. GRAHAM.

REFERENCES CITED

The following references are of record in the file of this patent:

UNITED STATES PATENTS

| Number | Name | Date |
|---|---|---|
| 2,049,502 | Hufferd et al. | Aug. 4, 1936 |
| 2,133,652 | Best | Oct. 18, 1938 |
| 2,144,162 | Leighton | Jan. 17, 1939 |
| 2,246,833 | Beemer | June 24, 1941 |
| 2,411,021 | Booth | Nov. 12, 1946 |
| 2,448,851 | Wharam et al. | Sept. 7, 1948 |
| 2,461,775 | Roos | Feb. 15, 1949 |
| 2,470,210 | Booth | May 17, 1949 |

FOREIGN PATENTS

| Number | Country | Date |
|---|---|---|
| 506,246 | Germany | Sept. 1, 1930 |
| 765,514 | France | Mar. 26, 1934 |